G. DARMSTÄDTER.
STEELYARD.
APPLICATION FILED JUNE 17, 1909.
960,837.
Patented June 7, 1910.
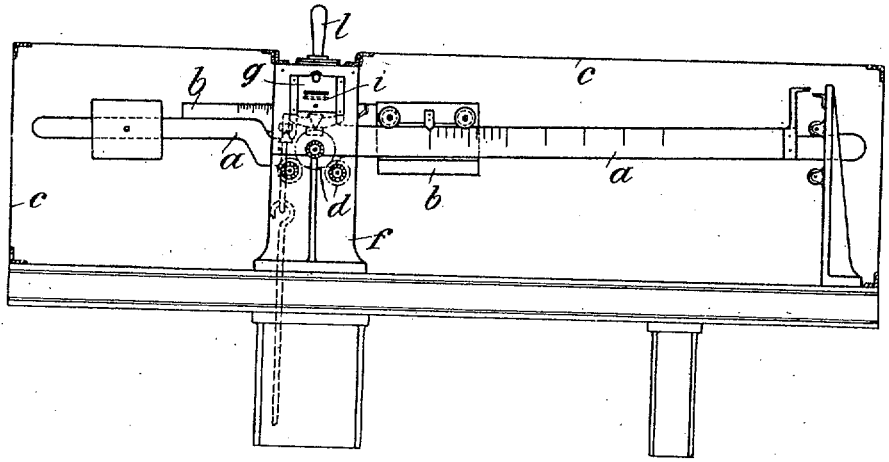
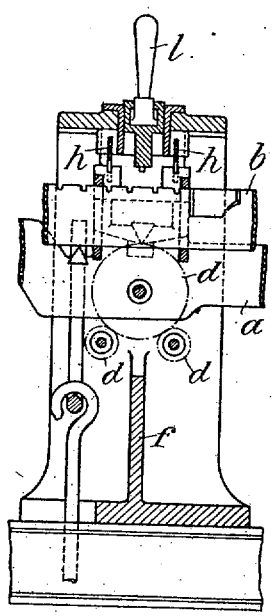 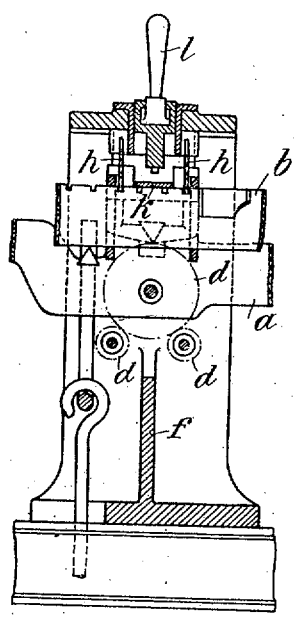 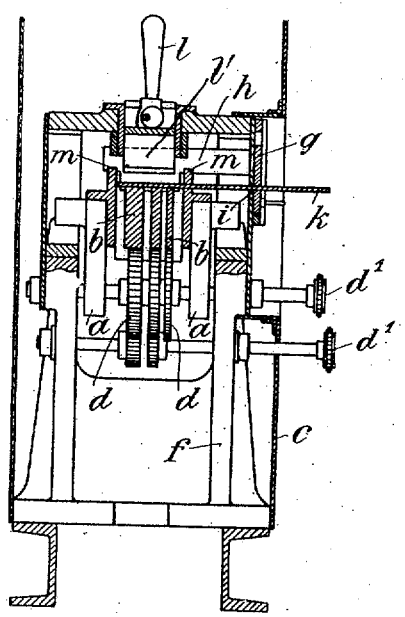
Witnesses
Inventor
Georg Darmstädter

UNITED STATES PATENT OFFICE.

GEORG DARMSTÄDTER, OF DARMSTADT, GERMANY, ASSIGNOR TO THE FIRM OF CARL SCHENCK, EISENGIESSEREI & MASCHINENFABRIK, GESELLSCHAFT MIT BESCHRÄNKTER HAFTUNG, OF DARMSTADT, GERMANY.

STEELYARD.

960,837. Specification of Letters Patent. Patented June 7, 1910.

Application filed June 17, 1909. Serial No. 502,681.

*To all whom it may concern:*

Be it known that I, GEORG DARMSTÄDTER, engineer, a subject of the Grand Duke of Hesse, and a resident of Kasinostrasse 26, Darmstadt, German Empire, have invented certain new and useful Improvements in and Relating to Steelyards, of which the following description, in connection with the accompanying drawing, is a specification.

The present invention has for its object a locking device for steelyards, in which it is only possible to print the weight in the position of equilibrium.

Heretofore the weighing and the impression of the weight have been effected in the known manner by adjusting the sliding weight upon the beam by hand and then printing the weight in the position of equilibrium. With this arrangement, however, it is possible to take impressions of the weight even when the sliding weight is not arranged in the position of equilibrium. The weight given in this manner is therefore incorrect. By means of the apparatus hereinafter described and illustrated in the accompanying drawing, any such incorrect weighing is entirely prevented.

Figure 1 illustrates the device in side elevation. Figs. 2 and 3 are longitudinal sections, and Fig. 4 is a cross section.

The device consists of a steelyard $a$ upon which the sliding weights $b$ $b$ are displaceably arranged. The steelyard $a$ and the sliding weights $b$ $b$ are inclosed in a closed casing $c$ so that it is impossible to bring the steelyard into the position of equilibrium unless the sliding weights likewise occupy this position. The sliding weights $b$ $b$ are toothed on their lower side and on their upper side are provided with numerals indicating a scale of weights from which an impression of the weight can be obtained by pressing against it a strip of cardboard or paper. Gear wheels $d$ mesh with the teeth of the sliding weight; these wheels are independent of each other and are operated from outside the casing $c$ in such a manner that by rotating the shafts $d'$ which carry the gear wheels $d$, the several sliding weights can be displaced. The bearings of the shafts $d'$ of these gear wheels $d$ are located on the bearing $f$ of the steelyard $a$ so that the play of the steelyard is not impeded by rotating the shafts. A slide $g$ or the like is provided on said bearing so that it can be displaced by hand, likewise from outside the casing. Inside the casing $c$ the slide $g$ carries two rails $h$ and when it is displaced these rails engage in recesses in plates $m$ fixed to the steelyard (see Fig. 4). The inter-engagement of the slide $h$ and the plates $m$ on the steelyard $a$ is only possible, however, when the steelyard is horizontal, that is to say when it occupies the position of equilibrium. By adjusting the slide $g$ an opening $i$ provided in the bearing of the steelyard is exposed; this opening serves for the insertion of a weight card $k$. This card can be printed by means of a plunger $l'$, operated by a lever $l$ arranged outside the casing $e$ and on the fixed bearing $f$. As shown in Figs. 2 and 3 the scales, that is to say the upper face of the sliding weights $b$ $b$, present recesses in which the rails $h$ $h$ engage in the same manner as in the plates $m$ on the steelyard $a$ (Fig. 4), the object being to prevent displacement of the scales or sliding weights when the weight card has been inserted in the slot $i$ but the weight has not yet been printed upon it.

This apparatus is used in the following manner: In the first place the sliding weights $b$ $b$ $b$ are arranged in succession in the position of equilibrium. When the position of equilibrium has been reached, the slide $g$ can be displaced, the slot $i$ thereby exposed and the weight card inserted and printed.

Having now particularly described and ascertained the nature of the said invention and in what manner the same is to be performed, I declare that what I claim is:

1. A device of the character described, comprising a scale beam, a weight slidable thereon, an inclosing casing having an aperture, a gate controlling said aperture, means controlled by the beam for locking the gate when the beam is unbalanced, and means controlled by the beam for liberating the weight and interlocking the weight with the gate when the beam is balanced.

2. A device of the character described, comprising a scale beam, a weight slidable thereon, an inclosing casing having an aperture, a gate controlling said aperture, means controlled by the beam for locking the gate when the beam is unbalanced, and means controlled by the beam for liberating the weight and interlocking the beam and weight with the gate when the beam is balanced.

In testimony, whereof I have affixed my signature in presence of two witnesses.

GEORG DARMSTÄDTER.

Witnesses:
JEAN GRUND,
CARL GRUND.